United States Patent Office 2,921,921
Patented Jan. 19, 1960

2,921,921

RESINOUS PRODUCTS FROM EPOXIDIZED POLYBUTADIENES AND POLYMERCAPTANS

Frank P. Greenspan, Buffalo, and Rupert E. Light, Jr., Kenmore, N.Y., assignors to Food Machinery and Chemical Corporation, San Jose, Calif.

No Drawing. Application June 13, 1956
Serial No. 591,009

12 Claims. (Cl. 260—45.5)

This invention relates to compositions useful in the preparation of synthetic, thermoset resinous products and to these products, and particularly to thermoset castings, moldings, coatings, and the like derived from modified polybutadienes.

Because of its ready availability and its physical properties, polybutadiene is a potentially useful raw material for the production of thermoset synthetic resinous products. Although it is possible to use polybutadiene directly for making coatings, these coatings are not entirely satisfactory, usually showing lack of adhesion and lack of toughness. Particularly difficult is the production of useful castings from polybutadiene.

It has been found in accordance with the present invention that a polybutadiene can be modified by reaction with a lower aliphatic peracid to produce a stable, complex, thermoplastic reaction product having reactive epoxy and hydroxy groups and acyloxy groups, and subsequently converted to thermoset condition by reaction with a polymercaptan. The composition of the present invention, from which the thermoset resinous product is derived, comprises a mixture of the thermoplastic reaction product with a polymercaptan.

The composition and thermoset resinous product of this invention are prepared by a series of steps which will be more fully discussed individually hereinafter. In principle, a polybutadiene first is treated with a lower aliphatic peracid having 1 to 10 carbon atoms. The product of this reaction normally contains reactive epoxy and hydroxy groups and acyloxy groups. However, although it contains highly reactive functional groups, the reaction product is thermoplastic and can be stored for extended periods without losing this thermoplasticity. At some time following its preparation the thermoplastic reaction product is blended with a polymercaptan and the resulting mixture is employed in the production of thermoset resinous products. This last treatment is carried out under conditions which are directly suitable for the production of castings, coatings and the like. If it be desired to produce a casting, the reaction product resulting from treating polybutadiene with a lower aliphatic peracid is mixed with a suitable polymercaptan and the mixture is poured into a mold. The mixture in the mold then is heated and thereby caused to set to a casting having properties ranging from rubbery to hard and tough, depending on the particular polybutadiene-lower aliphatic peracid reaction product and polymercaptan employed.

If it be desired to form a coating, the product obtained by treating polybutadiene with a lower aliphatic peracid is mixed in solvent solution with a suitable polymercaptan and this solvent mixture then applied to the surface to be coated and the coating heated. Upon evaporation of the solvent and reaction of the residue, an adherent coating having properties ranging from rubbery to hard and tough, and determined by the choice of polybutadiene-lower aliphatic peracid reaction product and polymercaptan, is obtained.

Polybutadienes generally can be used as the raw material in the process of this invention. Production of useful polybutadiene-lower aliphatic peracid reaction products in the sense of this invention requires a starting material of a certain minimum chain length, i.e. degree of polymerization. No theoretical upper limit exists for the chain length of the unsaturated starting material to be oxidized in accordance with this invention. However, there are certain practical considerations which impose a limit on the degree of polymerization of the starting material. Because the reaction of the polybutadiene with a lower aliphatic peracid has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the reaction products. A highly polymerized starting material will produce a reaction product of somewhat different properties than would be obtained by the use of a starting material of a lower degree of polymerization.

The physical state of polybutadiene is determined by its degree of polymerization and molecular weight. Any liquid or properly soluble polybutadiene may be used. Generally speaking, however, polybutadienes having the requisite solubility will have a molecular weight no higher than about 250,000. Preferably the molecular weight of the polybutadiene should be in the range of about 250 to 10,000.

The polybutadiene can be polymerized by any known method, for example emulsion, solution or bulk polymerization. However, it is preferred to employ a polybutadiene polymerized in solution in the presence of a catalytic amount of finely divided sodium. Polybutadienes having molecular weights in the preferred molecular weight range can be prepared readily by this method, and these products can be reproduced without difficulty.

The reaction of the polybutadiene is carried out in accordance with this invention by treating it with a lower aliphatic peracid. Suitable peracids are the aliphatic peracids having 1 to 10 carbon atoms. The reaction may be carried out using a preformed peracid or the peracid may be formed from its constituents during the reaction and in the reaction medium. In either case the reaction should be carried out under conditions favoring the protection of epoxy groups formed, for example in the case of the preformed peracid reaction, the reaction should be run at moderate temperatures, e.g. below about 75° C., and for only a few hours.

When reacting the polybutadiene with the lower aliphatic peracid, stoichiometric amounts of the peracid or amounts below that theoretically required completely to react with the double bonds present in the polybutadiene may be used. It is important, however, that the reaction product contain at least about 1% of oxirane oxygen in order that it will be highly reactive with the polymercaptan in forming thermoset products. In the following examples, polybutadienes treated with the stoichiometric amount of lower aliphatic peracid will be designated as "100% reacted," and their oxirane oxygen contents given. Polybutadienes reacted with reduced amounts of peracid will be designated by a percent figure to indicate what might be termed the degree of reaction in terms of the fraction of the theoretical amount of peracid used, and their oxirane oxygen contents likewise will be given. The reactivity and resin forming properties of the polybutadiene-lower aliphatic peracid reaction product will obviously vary with its degree of reaction with the lower aliphatic peracid, and with the amount of highly reactive oxirane oxygen which it contains. Generally speaking, a 100% reacted polybutadiene having a high oxirane oxygen content will be more reactive with the herein polymercaptans and will more readily form a casting or coating than will polybutadiene reacted to a lesser extent. At the same time the properties of the finished casting or coating will also be influenced to an extent by the degree of the reaction of the polybutadiene.

As indicated above, the polybutadiene-lower aliphatic peracid reaction product is treated at some time subsequent to its preparation, with a polymercaptan. Suitable polymercaptans include the alkylene dimercaptans, such as pentamethylene dimercaptan, decamethylene dimercaptan and the like, as well as the polymeric polymercaptans, such as the reaction products of dihalides and sodium tetrasulfide which are dimercaptans containing terminal mercaptan groups. The polymeric polymercaptans are sold by the Thiokol Corporation of Trenton, New Jersey. The polymercaptans may contain other active hydrogen containing functional groups reactive with oxirane oxygen, and further may possess the ability to crosslink among themselves thereby augmenting the thermosetting reaction between the polymercaptan and the epoxy containing polymer.

Certain limitations on the choice of such polymercaptans are, however, imposed by the practical process requirements. If casting resins are to be produced, the polybutadiene reaction product has to be mixed with such polymercaptans before casting and heating. To permit proper mixing and use, the two main ingredients, the polybutadiene reaction product and the polymercaptan, should combine to give a liquid, pourable mixture at room or moderately elevated temperature. Therefore, in the case of casting resins, the polymercaptans should be those liquid at ordinary temperature, those which possess a relatively low melting point to permit mixing at room temperature or at moderately elevated temperature, or those which are soluble in the polybutadiene-lower aliphatic peracid reaction product. In the case of coating resins, a solvent is invariably used from which the coating is then obtained by evaporation. In this case the polymercaptans used are those soluble in the solvent from which the coating is to be made.

The amount of polymercaptan to be used for treating the polybutadiene-lower aliphatic peracid reaction product depends on the oxirane oxygen content of the polybutadiene-lower aliphatic peracid reaction product, the particular polymercaptan used, and the properties desired in the thermoset resinous product. The amount to be used is calculated on the basis of equivalent weights. In cases where full reaction is desired, one equivalent weight of the polybutadiene-lower aliphatic peracid reaction product, that is, the weight of reaction product containing 16 g. of oxirane oxygen, is treated with one equivalent weight of the polymercaptan. The equivalent weight of the polymercaptan is here defined as the molecular weight of the polymercaptan divided by the number of mercaptan groups contained in it. The amount of polymercaptan calculated in this way represents the theoretical amount for complete reaction. For example, if a sample of polybutadiene-lower aliphatic peracid reaction product is found by analysis to contain 6.6 g. of oxirane oxygen per 100 grams of the reaction product, its equivalent weight will then be $$\frac{100 \times 16}{6.6} \text{ or } 242 \text{ grams}$$

If this product is to be treated with, e.g. nonamethylene dimercaptan, calculation shows that the equivalent weight of this polymercaptan is $$\frac{192}{2} \text{ or } 96 \text{ grams}$$

The theoretical amount of nonamethylene dimercaptan to be used with this particular polybutadiene reaction product would then be $$\frac{96}{242} \text{ or } 0.400 \text{ gram}$$

of polymercaptan per gram of the reaction product.

In accordance with this invention, from 10 to 100% of the calculated theoretical amount of polymercaptan may be used in the production of the new casting or coating resins of this invention. The amount of reaction between any given polybutadiene-lower aliphatic peracid reaction product and the polymercaptan will determine largely its degrees of solvent and heat resistances and hardness, and is dependent both on the amount of oxirane oxygen in the polybutadiene reaction product and the amount of polymercaptan used.

The following examples will illustrate in some detail the principle of this invention.

*Example 1*

100 g. of a polybutadiene having a viscosity of 1500 cp. at 100° F., was dissolved in 100 ml. of benzene. To this solution was added slowly, over a period of about one hour, 275 g. of 40% peracetic acid. This amount of peracetic acid corresponds to the stoichiometric amount required fully to epoxidize the polybutadiene. The temperature was maintained at about 20° to 25° C. over the total reaction time of 4 hours. The product then was washed with alkaline sodium chloride aqueous solutions, and finally with distilled water. The mixture was filtered and excess solvent was removed at reduced pressure. The solvent-free product then was dried in a vacuum desiccator. The product was analyzed and found to contain 6.6% oxirane oxygen.

10 g. of the epoxidized polybutadiene prepared as described above then was dissolved in 90 ml. of benzene, and 2.8 g. of pentamethylene dimercaptan was added to this solution. This amount of the dimercaptan corresponds to 100% of the stoichiometric amount required for full reaction with the epoxidized polybutadiene. The solution was then coated onto a glass plate, dried and baked at 150° C. for one hour. The resulting film was tough, clear and well-adherent to the plate, and somewhat resembled a cellophane film.

*Example 2*

10 g. of the epoxidized polybutadiene of Example 1 was dissolved in 90 ml. of benzene and 4.3 g. of decamethylene dimercaptan was added to this solution. The mixture was then coated onto a glass plate, dried and baked at 150° C. for one hour. The amount of the dimercaptan corresponds to 100% of the stoichiometric amount required for full reaction wtih the epoxidized polybutadiene. The film resulting from this treatment was a clear, extremely hard product.

*Example 3*

100 g. of a rubbery polybutadiene was dissolved in 150 ml. of benzene. To this solution was added slowly, over a period of about one hour, 275 g. of 40% peracetic acid. This amount of peracetic acid corresponds to the stoichiometric amount required fully to epoxidize the polybutadiene. The temperature was maintained at about 20° to 25° C. over a total reaction time of about 4 hours. The product then was isolated as described in Example 1, and upon analysis was found to contain 6.7% oxirane oxygen.

10 g. of the epoxidized polybutadiene prepared as described above was dissolved in 90 ml. of benzene, and 4.0 g. of nonamethylene dimercaptan was added to this solution. The solution was coated onto a glass plate, dried and baked at 150° C. for one hour. The resulting film was tough, hard and adhered well to the glass plate.

Example 4

10 g. of the epoxidized polybutadiene of Example 1 was dissolved in 90 ml. of benzene. To this solution was added 3.2 g. of Thiokol ZC–119. The Thiokol ZC–119 is a liquid polymercaptan polymer, formed by the reaction of ethylene dichloride and sodium tetrasulfide, and is produced by The Thiokol Corporation of Trenton, New Jersey. This solution then was coated onto a glass plate, dried and baked for one hour at 150° C. The film which resulted was a moderately tough, strongly adherent and hard product.

Example 5

25 g. of a liquid polybutadiene was dissolved in 100 ml. of benzene. To this solution was added slowly, over a period of about 15 minutes, 48.8 g. of 64% perpelargonic acid. This amount of peracid corresponds to 50% of the stoichiometric amount required fully to epoxidize the polybutadiene. The temperature was maintained at about 35° C. during addition of the peracid and for about one hour thereafter. The reaction batch then was washed free of acid over an anion exchange resin, Amberlite IRA–410, by stirring the reaction batch in a slurry of the resin. The Amberlite IRA–410 is a weakly basic amine type anion exchange resin, and is produced by The Resinous Products Division of The Rohm and Haas Company, Philadelphia, Pa. The product then was dried over magnesium sulfate, filtered free of this agent, and stripped of residual solvent at reduced pressure. The product was analyzed and found to contain 7.24% of oxirane oxygen.

5 g. of the epoxidized polybutadiene prepared as described above was dissolved in 50 g. of toluene, and to this solution was added 1.1 g. of nonamethylene dimercaptan. This amount of dimercaptan corresponds to 50% of the amount required for full reaction with the epoxidized polybutadiene. The solution then was poured into a small aluminum cup, the solvent evaporated, and the residue was baked at 150° C. for 2 hours. The product then was cooled and removed from the cup, being recovered as a rubbery, tough casting.

Example 6

25 g. of a liquid polybutadiene was dissolved in 70 g. of toluene. To this solution was added slowly, over 15 minutes, 165 g. of 31.6 perbutyric acid. This amount of the peracid corresponds to the stoichiometric amount required fully to epoxidize the polybutadiene. During the addition the temperature was held at 25° C., and following addition the temperature was raised to 40° C. where it was held for the remainder of the reaction, which took place over 1¾ hours. The reaction batch was washed several times with distilled water, with the final wash containing 10% of sodium hydroxide. The product was dried over magnesium sulfate, filtered to remove this agent, and stripped of solvent under reduced pressure. The product contained 9.0% oxirane oxygen.

10 g. of the epoxidized polybutadiene prepared as above was dissolved in 90 ml. of toluene, and 1.5 g. of decamethylene dimarcaptan was added to this solution. This amount of dimercaptan corresponds to 25% of the amount required for full reaction with the epoxidized polybutadiene. The solution was poured into an aluminum cup, the solvent evaporated and the residue was baked for 2 hours at 150° C. The product was cooled, and removed from the cup as a rubbery, tack-free casting.

Example 7

100 g. of a polybutadiene having a viscosity of 1500 cp. at 100° F., was dissolved in 100 ml. of benzene. To this solution was added slowly, over a period of about one hour, 275 g. of 40% peracetic acid. This amount of peracetic acid corresponds to the stoichiometric amount required fully to epoxide the polybutadiene. The temperature was maintained at about 20° to 25° C. over the total reaction time of 4 hours. The product then was washed with alkaline sodium chloride aqueous solutions, and finally with distilled water. The mixture was filtered and excess solvent was removed at reduced pressure. The solvent-free product then was dried in a vacuum desiccator. The product was analyzed and found to contain 6.6% oxirane oxygen.

10 g. of the epoxidized polybutadiene prepared as described above was dissolved in 90 ml. of benzene. To this was added 6.2 g. of Thiokol ZC–109, a polymeric polymercaptan produced by The Thiokol Corporation of Trenton, New Jersey. This amount of the polymercaptan was 50% of the stoichiometric amount required for full reaction with the epoxidized polybutadiene. This solution was coated onto a glass plate, dried and baked at 150° C. for one hour. The resulting film was a slightly hard product which was well-adherent to the glass plate.

What is claimed is:

1. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with a 1 to 10 carbon atom lower aliphatic peracid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

2. Thermoset resinous product prepared from the composition of claim 1 by heating said composition until said thermoset resinous product has been produced.

3. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with performic acid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

4. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with peracetic acid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

5. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with perpropionic acid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

6. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with perbutyric acid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

7. Thermosetting, organic solvent soluble composition useful in the preparation of thermoset resinous products, said composition comprising (a) the reaction product of a polybutadiene having a molecular weight of 250 to 250,000 and containing as polymer forming units with only a 1 to 10 carbon atom lower aliphatic peracid and containing at least 1% of oxirane oxygen, and (b) pentamethylene dimercaptan, said pentamethylene dimercaptan being present in an amount of at least 10% of the stoichiometric amount required for complete reaction with the oxirane oxygen in said reaction product.

8. Thermosetting, organic solvent soluble composition useful in the preparation of thermoset resinous products, said composition comprising (a) the reaction product of a polybutadiene having a molecular weight of 250 to 250,000 and containing as polymer forming units only butadienes and a 1 to 10 carbon atom lower aliphatic peracid and containing at least 1% of oxirane oxygen, and (b) nonamethylene dimercaptan, said nonamethylene dimercaptan being present in an amount of at least 10% of the stoichiometric amount required for complete reaction with the oxirane oxygen in said reaction product.

9. Theremosetting, organic solvent soluble composition useful in the preparation of thermoset resinous products, said composition comprising (a) the reaction product of a polybutadiene having a molecular weight of 250 to 250,000 and containing as polymer forming units only butadienes with a 1 to 10 carbon atom lower aliphatic peracid and containing at least 1% of oxirane oxygen, and (b) decamethylene dimercaptan, said decamethylene dimercaptan being present in an amount of at least 10% of the stoichiometric amount required for complete reaction with the oxirane oxygen in said reaction product.

10. Thermosetting, organic solvent soluble composition useful in the preparation of thermoset resinous products, said composition comprising (a) the reaction product of a polybutadiene having a molecular weight of 250 to 250,000 and containing as polymer forming units only butadienes with a 1 to 10 carbon atom lower aliphatic peracid and containing at least 1% of oxirane oxygen, and (b) a polymeric polymercaptan, said polymeric polymercaptan being present in an amount of at least 10% of the stoichiometric amount required for complete reaction with the oxirane oxygen in said reaction product.

11. Thermosetting, organic solvent soluble composition useful in the preparation of thermoset resinous products, said composition comprising (a) the reaction product of a polybutadiene having a molecular weight of 250 to 10,000 and containing as polymer forming units only butadienes with a 1 to 10 carbon atom lower aliphatic peracid and containing at least 1% of oxirane oxygen, and (b) a polymercaptan from the group consisting of the alkylene dimercaptans and the terminal dimercaptan reaction products of the alkylene dihalides and sodium tetrasulfide, said polymercaptan being present in an amount of at least 10% of the stoichiometric amount required for complete reaction with the oxirane oxygen in said reaction product.

12. Thermoset resinous product prepared from the composition of claim 11 by heating said composition until said thermoset resinous product has been produced.

References Cited in the file of this patent

UNITED STATES PATENTS

| | | |
|---|---|---|
| 2,660,563 | Banes | Nov. 24, 1953 |
| 2,698,315 | Greenlee | Dec. 28, 1954 |
| 2,789,958 | Fettes et al. | Apr. 23, 1957 |